(12) United States Patent
Kohge et al.

(10) Patent No.: US 12,554,408 B2
(45) Date of Patent: Feb. 17, 2026

(54) SYSTEM AND METHOD TO MANAGE DISK WRITE BUFFER

(71) Applicants: Hiroaki Kohge, Kanagawa (JP); Hiroomi Motohashi, Kanagawa (JP)

(72) Inventors: Hiroaki Kohge, Kanagawa (JP); Hiroomi Motohashi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 18/642,489

(22) Filed: Apr. 22, 2024

(65) Prior Publication Data
US 2024/0361913 A1    Oct. 31, 2024

(30) Foreign Application Priority Data

Apr. 27, 2023   (JP) .................... 2023-073340
Jun. 26, 2023   (JP) .................... 2023-104566

(51) Int. Cl.
   *G06F 3/06* (2006.01)
(52) U.S. Cl.
   CPC .......... *G06F 3/0613* (2013.01); *G06F 3/0656* (2013.01); *G06F 3/0659* (2013.01); *G06F 3/0676* (2013.01)
(58) Field of Classification Search
   CPC .... G06F 3/0613; G06F 3/0656; G06F 3/0659; G06F 3/0676
   USPC ................................. 711/154, 118
   See application file for complete search history.

(56) References Cited

U.S. PATENT DOCUMENTS

| | | | |
|---|---|---|---|
| 2009/0077326 A1 | 3/2009 | Motohashi | |
| 2011/0066671 A1 | 3/2011 | Motohashi | |
| 2017/0003894 A1* | 1/2017 | Hess | G06F 12/0802 |
| 2017/0277438 A1* | 9/2017 | Gole | G06F 3/0689 |
| 2018/0260332 A1* | 9/2018 | Dunn | G06F 3/0685 |
| 2019/0230229 A1 | 7/2019 | Terauchi | |
| 2020/0356295 A1* | 11/2020 | Shen | G06F 12/1045 |
| 2023/0315316 A1* | 10/2023 | Frolikov | G06F 3/0607 |
| | | | 711/154 |

FOREIGN PATENT DOCUMENTS

| | | |
|---|---|---|
| JP | 2019-129406 A | 8/2019 |
| JP | 2021-149984 A | 9/2021 |

* cited by examiner

*Primary Examiner* — Than Nguyen
(74) *Attorney, Agent, or Firm* — Duft & Bornsen, PC

(57) ABSTRACT

An information processing apparatus includes a nonvolatile memory and circuitry. The nonvolatile memory stores data written using shingled magnetic recording, in which tracks are partially arranged one over another in a radial direction. The circuitry is to instruct the nonvolatile memory to write the data in units of sectors, additionally write the data to a data writing area of the nonvolatile memory, create, on a volatile memory, a buffer for delayed writing in which the data to be written to the data writing area is temporarily held, and write the data in the buffer for delayed writing to the nonvolatile memory in a case that a total amount of data accumulated in the buffer for delayed writing exceeds a threshold value.

13 Claims, 11 Drawing Sheets

SYSTEM AND METHOD TO MANAGE DISK WRITE BUFFER

CROSS-REFERENCE TO RELATED APPLICATIONS

This patent application is based on and claims priority pursuant to 35 U.S.C. § 119 (a) to Japanese Patent Application Nos. 2023-073340, filed on Apr. 27, 2023 and 2023-104566, filed on Jun. 26, 2023, in the Japan Patent Office, the entire disclosure of which is hereby incorporated by reference herein.

BACKGROUND

Technical Field

Embodiments of the present disclosure relate to an information processing apparatus, an information processing system, a data writing method, and a non-transitory recording medium.

Related Art

In an embedded system that requires real-time performance, a hard disk drive (HDD) using shingled magnetic recording (SMR) is sometimes adopted in place of an HDD using conventional magnetic recording (CMR), because the HDD using SMR is inexpensive and space-saving, despite having the same storage capacity as that of the HDD using CMR.

In order to increase the write performance of the HDD using SMR, when a plurality of requests for sequentially writing to a shingle band is made, a header is added to an individual piece of data in the HDD using SMR at each time a request for writing is received, so that writing to the band can be executed at one time.

SUMMARY

In one aspect, an information processing apparatus includes a nonvolatile memory and circuitry. The nonvolatile memory stores data written using shingled magnetic recording, in which tracks are partially arranged one over another in a radial direction. The circuitry is to instruct the nonvolatile memory to write the data in units of sectors, additionally write the data to a data writing area of the nonvolatile memory, create, on a volatile memory, a buffer for delayed writing in which the data to be written to the data writing area is temporarily held, and write the data in the buffer for delayed writing to the nonvolatile memory in a case that a total amount of data accumulated in the buffer for delayed writing exceeds a threshold value.

In another aspect, an information processing system includes a volatile memory, a nonvolatile memory, and circuitry. The nonvolatile memory stores data written using shingled magnetic recording, in which tracks are partially arranged one over another in a radial direction. The circuitry is to instruct the nonvolatile memory to write the data in units of sectors, additionally write the data to a data writing area of the nonvolatile memory, create, on a volatile memory, a buffer for delayed writing in which the data to be written to the data writing area is temporarily held, and write the data in the buffer for delayed writing to the nonvolatile memory in a case that a total amount of data accumulated in the buffer for delayed writing exceeds a threshold value.

In another aspect, a data writing method executed by an information processing apparatus includes instructing a nonvolatile memory that stores data written using shingled magnetic recording, in which tracks are partially arranged one over another in a radial direction, to write the data in units of sectors, additionally writing the data to a data writing area of the nonvolatile memory, creating, on a volatile memory, a buffer for delayed writing in which the data to be written to the data writing area is temporarily held, and writing the data in the buffer for delayed writing to the nonvolatile memory in a case that a total amount of data accumulated in the buffer for delayed writing exceeds a threshold value.

In another aspect, a non-transitory recording medium storing a plurality of program codes which, when executed by one or more processors, causes the one or more processors to perform the method described above.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1:
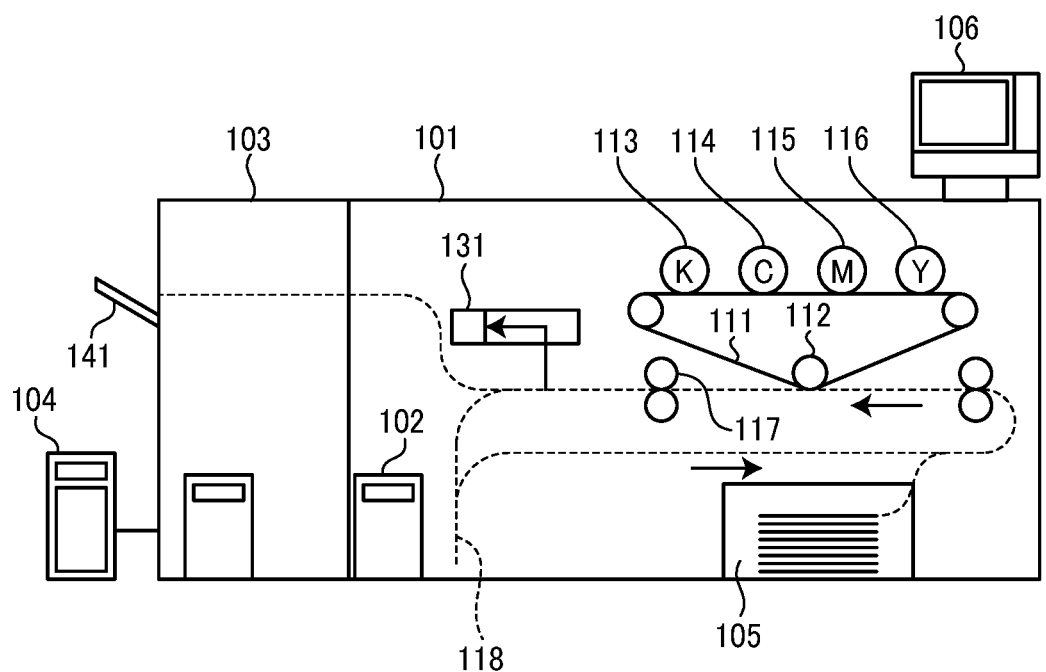
FIG. 1 is a diagram illustrating a configuration of a printer to which an information processing apparatus according to an embodiment of the present disclosure is connected.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

An information processing apparatus, an information processing system, a data writing method, and a non-transitory recording medium according to embodiments of the present disclosure are described in detail below with reference to the accompanying drawings.

The information processing apparatus according to the present embodiment includes a hard disk drive (HDD) using shingled magnetic recording (SMR). In writing to the HDD using SMR, a write control program directly specifies a sector to be written to cause the sector to write sequentially, prepares a buffer for writing to the HDD using SMR on a volatile memory, and accumulates requests for writing for a certain size to execute delayed writing.

FIG. 1 is a diagram illustrating a configuration of a printer to which the information processing apparatus according to an embodiment of the present disclosure is connected. The entire operation of a printer 101 (an example of an image forming apparatus) is controlled by an information processing apparatus 102. When print information is transmitted from an external controller 104 such as a PC, the printer 101 acquires a sheet from a sheet feeder 105 and conveys the sheet along a path indicated by a dotted line in the drawing. The printer 101 superimposes toner images of black (K), cyan (C), magenta (M), and yellow (Y) colors, which are respectively formed on drums 113, 114, 115, and 116, one above the other on a belt 111 to form a full-color toner image, transfers the full-color toner image onto the sheet conveyed by a roller 112, and fixes the full-color toner image on the sheet by a roller pair 117.

The printer 101 reads the sheet conveyed from the roller pair 117 using a reading device 131, such as a sensor. The information processing apparatus 102 stores the read image read by the reading device 131 in a memory. In the case of single-sided printing, in one example, the printer 101 ejects the sheet to a stacker 103 without executing any other process. In the case of double-sided printing, the printer 101 reverses the sheet in a reverse path 118, transfers and fixes another full-color toner image also onto the back face of the sheet, and ejects the sheet having both sides printed to the stacker 103. The stacker 103 stacks the sheet ejected from the printer 101 on a tray 141.

Figure 2:
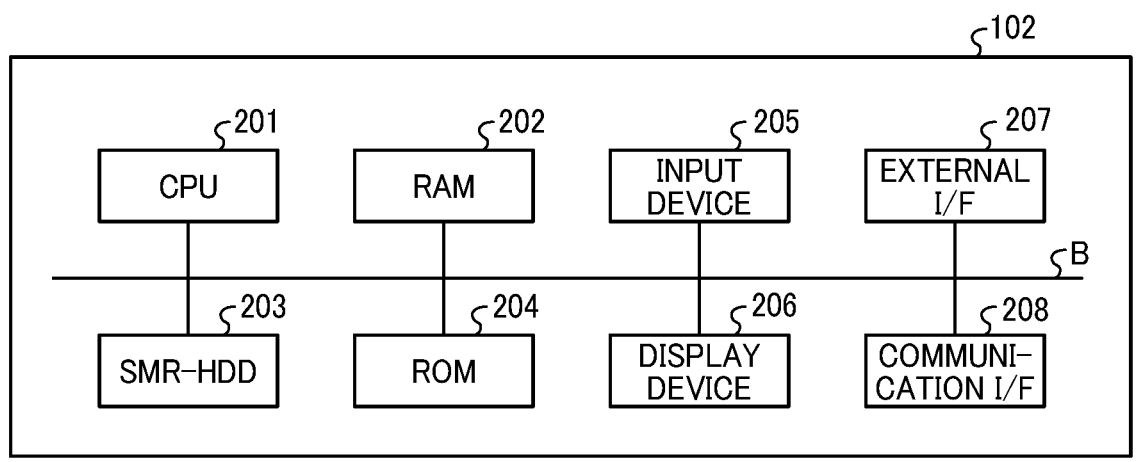
FIG. 2 is a block diagram illustrating a hardware configuration of the information processing apparatus according to the embodiment of the present disclosure.

FIG. 2 is a block diagram illustrating a hardware configuration of the information processing apparatus 102 according to the embodiment of the present disclosure. The information processing apparatus 102 includes a central processing unit (CPU) 201, a random-access memory (RAM) 202, an HDD using SMR 203, a read-only memory (ROM) 204, an input device 205, a display device 206, an external interface (I/F) 207, and a communication interface (I/F) 208, which are connected to each other via a bus B. The HDD using SMR 203 is an example of a nonvolatile storage device in which data is written using the shingled magnetic recording in which tracks are partially arranged one over the other in the radial direction.

The CPU 201 controls the entire operation of the printer 101.

The RAM 202 is used as a work area for the CPU 201.

The ROM 204 stores a program such as an initial program loader (IPL) used for executing the CPU 201.

The input device 205 receives user inputs, and may be implemented by, for example, a control panel 106 as illustrated in FIG. 1.

The display device 106 displays various information to the user, and may be implemented by, for example, a display section such as a liquid crystal display of the control panel 106.

The input device 206 and the display device 106 may be integrally formed into a single device such as a touch panel.

The external I/F 207, which is implemented by an interface circuit, connects the information processing apparatus 102 to another device.

The communication I/F 208, which is implemented by a network interface circuit, enables communication with another device through a network.

Figure 3:
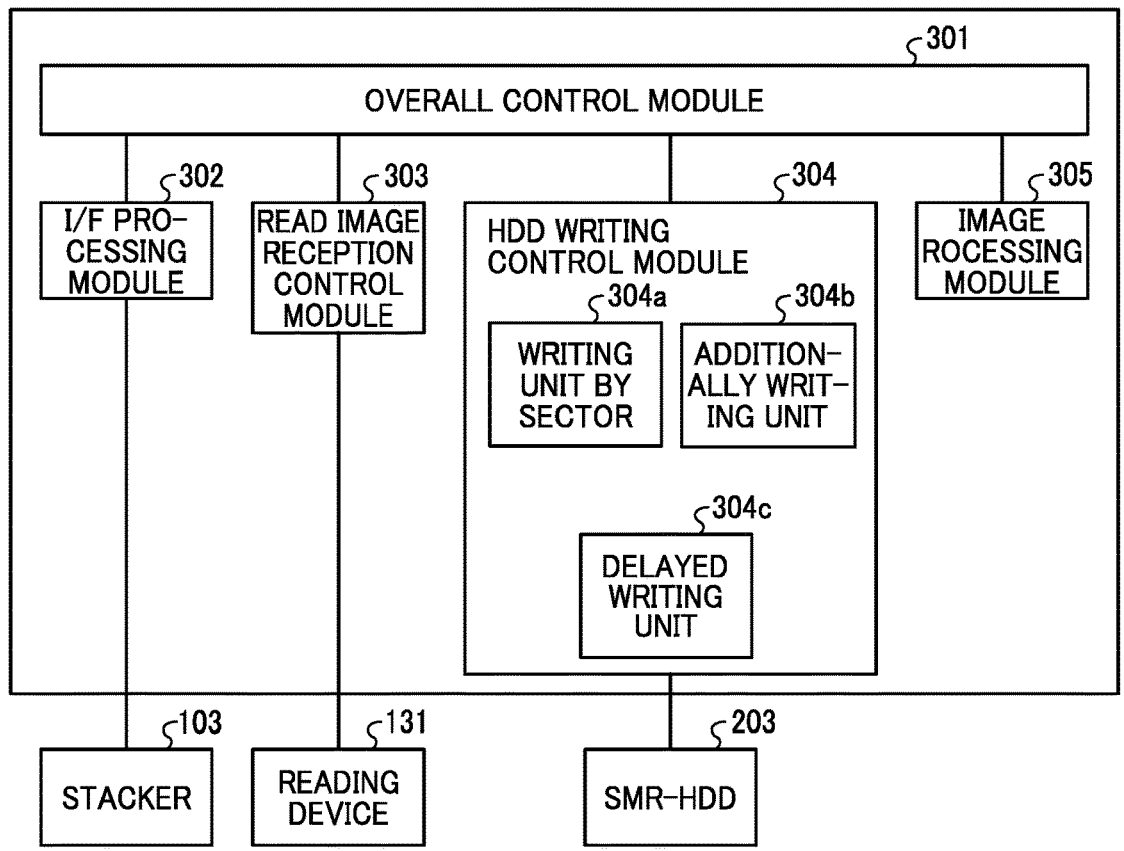
FIG. 3 is a block diagram illustrating a configuration of software operating on the information processing apparatus according to the embodiment of the present disclosure.

FIG. 3 is a block diagram illustrating a configuration of software operating on the information processing apparatus 102 according to the embodiment of the present disclosure. As the CPU 201 reads instructions of the software of the information processing apparatus 102 from the memory, the CPU 201 implements an overall control module 301, an interface (I/F) processing module 302, a read image reception control module 303, a hard disk drive (HDD) writing control module 304, and an image processing module 305.

The overall control module 301 acquires the print information via the I/F processing module 302, and instructs the read image reception control module 303 to receive a read image from the reading device 131. The overall control module 301 transmits the read image to the HDD writing control module 304 and instructs the HDD writing control module 304 to store the read image in the HDD using SMR 203. Alternatively, the overall control module 301 transmits the read image to the image processing module 305 and instructs the image processing module 305 to execute the image processing on the read image. The overall control module 301 is an example of a component for requesting file writing that instructs the HDD using SMR 203 to write data in units of sectors.

The I/F processing module 302 acquires, for example, the print information from an external apparatus, such as the external controller 104 implemented by the PC. The read image reception control module 303 receives the read image from the reading device 131 in response to an instruction from the overall control module 301. The image processing module 305 executes the image processing on the read image in response to an instruction from the overall control module 301.

The HDD writing control module 304 includes a writing unit by sector 304a, an additionally writing unit 304b, and a delayed writing unit 304c. The writing unit by sector 304a writes data to the data writing area of the HDD using SMR 203 in units of sectors. The additionally writing unit 304b is an example of a component that additionally writes data to the data writing area of the HDD using SMR 203.

The delayed writing unit 304c creates, on the RAM 202 (see FIG. 2) which is an example of a volatile memory, a buffer for writing (an example of a buffer for delayed writing) in which the data to be written to the data writing area of the HDD using SMR 203 is temporarily held. The delayed writing unit 304c is also an example of a component for delayed writing that writes the data in the buffer for writing to the HDD using SMR 203 when the total amount of data accumulated in the buffer for writing exceeds a threshold value. In this way, the number of free sectors to be fragmented is reduced. In addition, the number of requests for writing data of small size or the number of requests for writing data at random access is reduced. Furthermore, even when a cache flush occurs, the waiting time due to the delayed writing is compensated. As a result, when the HDD using SMR 203 is adopted, the write performance in an embedded system that requires real-time performance is ensured.

Figure 4:
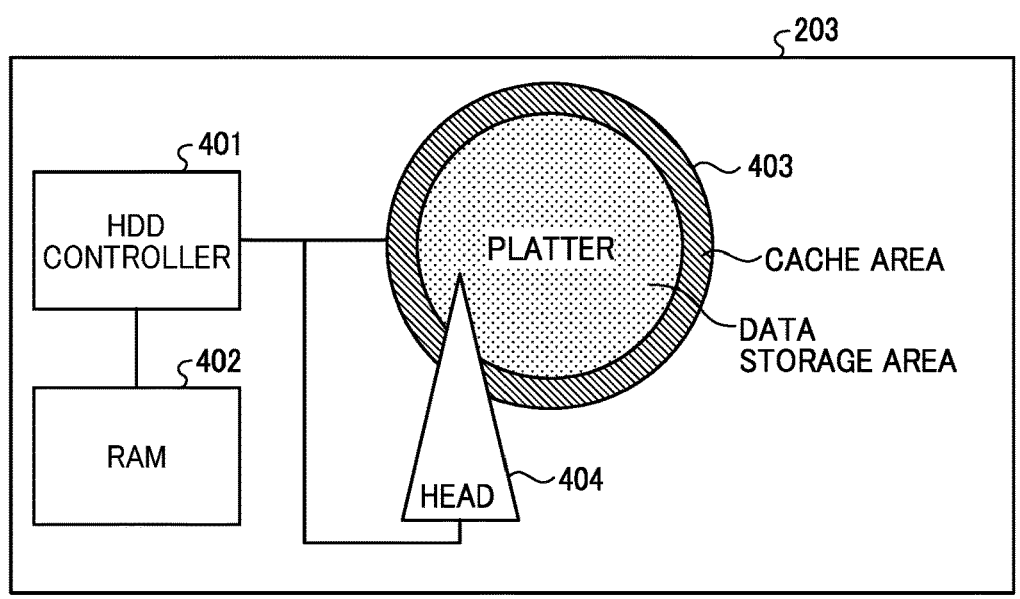
FIG. 4 is a diagram illustrating a configuration of a hard disk drive (HDD) using shingled magnetic recording (SMR) included in the information processing apparatus according to the embodiment of the present disclosure.

FIG. 4 is a diagram illustrating a configuration of the HDD using SMR 203 included in the information processing apparatus 102 according to the embodiment of the present disclosure. In the present embodiment, the HDD using SMR 203 includes an HDD controller 401, a RAM 402 as an example of a volatile memory, a platter 403, and a head 404, which are connected to each other via a bus. The platter 403 includes a cache area for storing requests for writing and a data storage area. The HDD using SMR 203 rotates the platter 403 (such as a disk-shaped metal plate) and causes the head 404 (such as a magnetic head) to read and write data. The data storage area (storage area) of the platter 403 includes tracks, which are data storage areas divided concentrically, and sectors (with usually 512 bytes), which are small units of data storage areas obtained by further dividing the tracks in the circumferential direction.

Figure 5A:
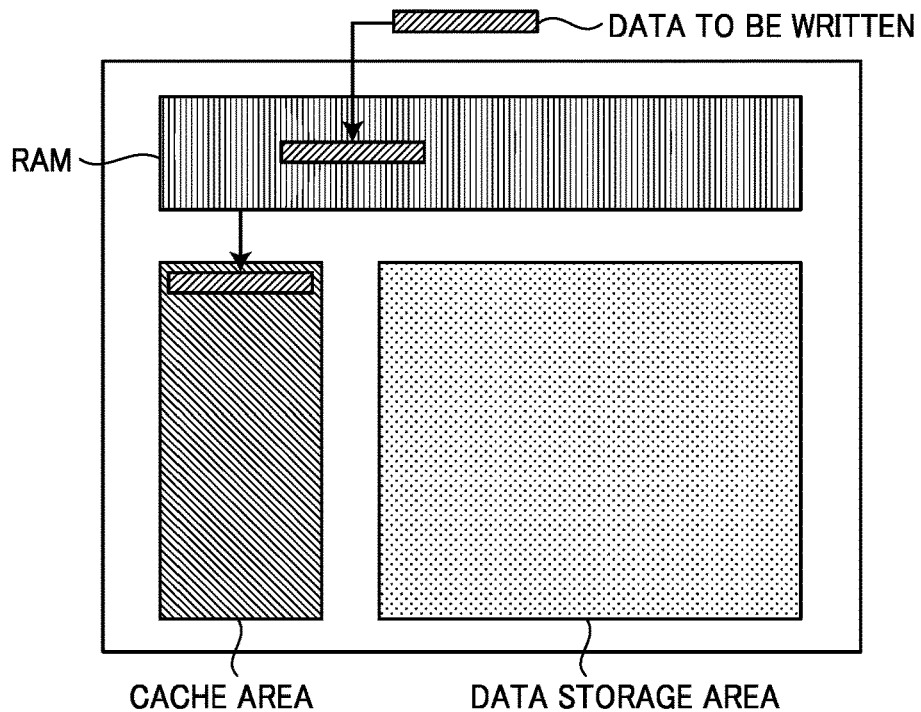
FIG. 5A is a diagram illustrating a process of writing data to the HDD using SMR, according to a comparative example.
Figure 5B:
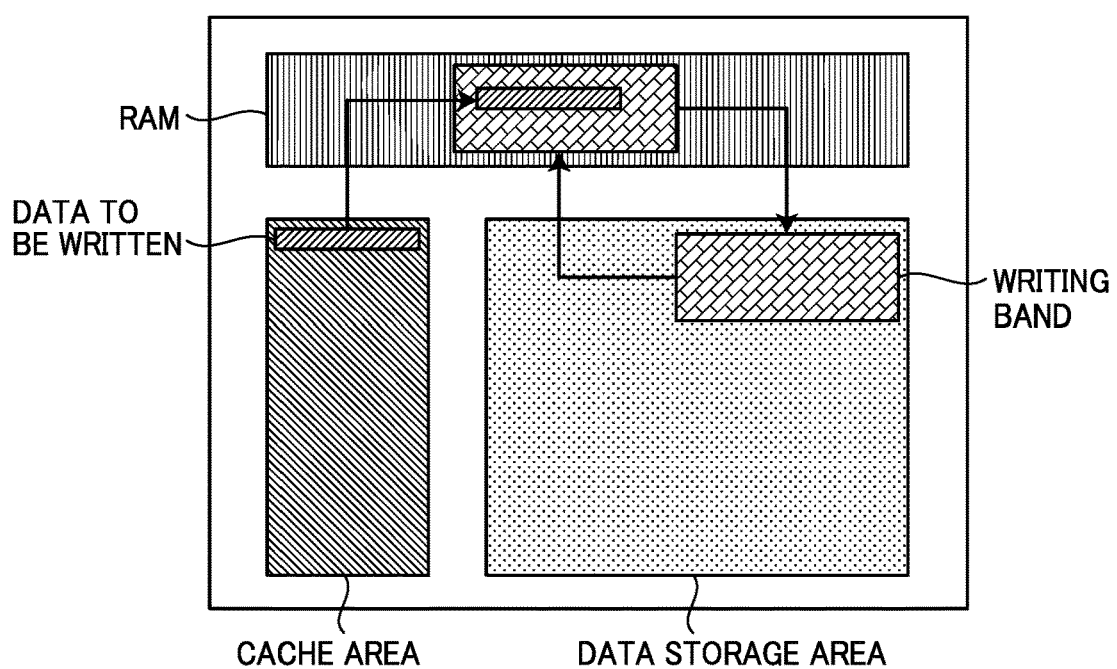
FIG. 5B is a diagram illustrating a process of writing data to the HDD using SMR, according to another comparative example.

FIGS. 5A and 5B are diagrams each illustrating a process of writing data to the HDD using SMR 203, according to a comparative example. As illustrated in FIGS. 5A and 5B, when data of small size is written or data at random access is written to the data writing area of the HDD using SMR 203, the process of writing data is repeatedly executed in units of large bands relative to the size of the data to be written. As a result, the write performance of data is degraded.

Figure 6A:
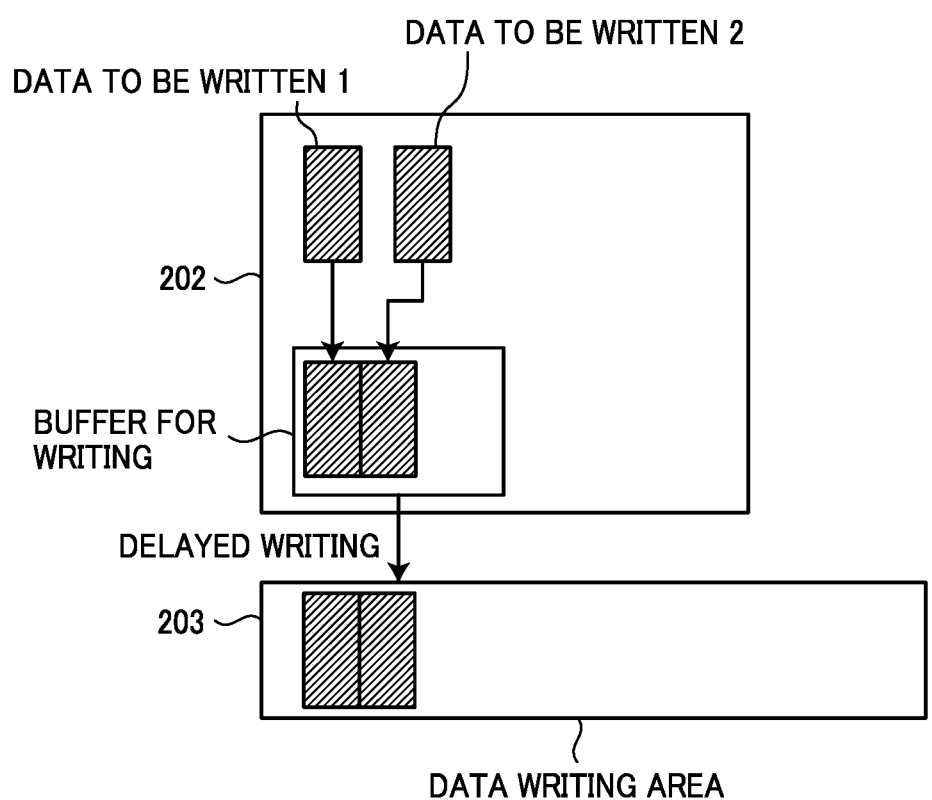
FIG. 6A is a diagram illustrating a process of writing data to the HDD using SMR included in the information processing apparatus according to the embodiment of the present disclosure.

In view of the above, in the present embodiment, as illustrated in FIG. 6A, the delayed writing is executed to reduce the number of times of writing data of small size or the number of times of writing data at random access. In response to receiving an instruction to store the read image from the overall control module 301, the HDD writing control module 304 (delayed writing unit 304c) sequentially writes the data to be written to the buffer for writing on the RAM 202. Then, the HDD writing control module 304 (delayed writing unit 304c) writes the data to be written to the HDD using SMR 203 according to the processing illustrated in FIG. 6B.

Figure 6B:
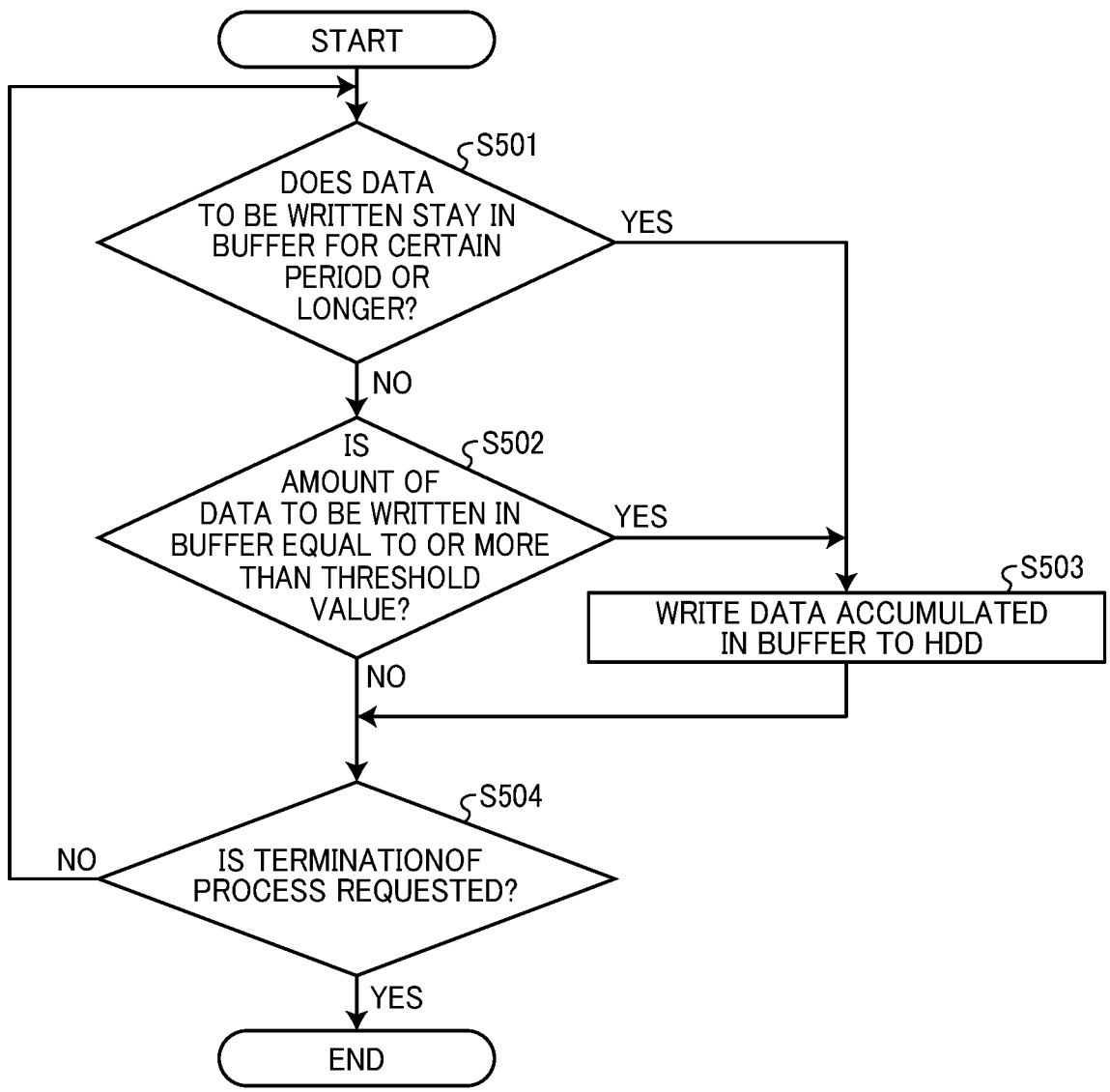
FIG. 6B is a flowchart of the processing to write data to the HDD using SMR included in the information processing apparatus according to the embodiment of the present disclosure.

FIG. 6B is a flowchart of the processing to write data to the HDD using SMR 203 included in the information processing apparatus 102 according to the embodiment of the present disclosure. The delayed writing unit 304c monitors the buffer for writing on the RAM 202 and determines whether data to be written stays in the buffer for writing for a certain period of time or longer (step S501). In the case where the data to be written does not stay in the buffer for writing for the certain period of time or longer (NO in step S501), the delayed writing unit 304c determines whether the total amount of the data to be written accumulated in the buffer for writing is equal to or more than the threshold value (step S502).

In the case where the data to be written stays in the buffer for writing for the certain period of time or longer (YES in step S501) or in the case where the total amount of the data to be written accumulated in the buffer for writing is equal to or more than the threshold value (YES in step S502), the delayed writing unit 304c sequentially executes a process of collectively writing the data accumulated in the buffer for writing to the HDD using SMR 203 (step S503). At this time, since the optimal size of the buffer for writing and the threshold value vary depending on the printing cycle of the printer 101, the size of the read image, and the write performance of the HDD using SMR 203, an optimal size of the buffer for writing and an optimal threshold value may be adopted by experimenting operations of the delayed writing while changing the size of the buffer for writing and the threshold value according to the write performance of the HDD using SMR 203.

After writing the data to the HDD using SMR 203, the delayed writing unit 304c determines whether a request for terminating the process of storing the read image is made by the overall control module 301 (step S504). In the case where a request for terminating the process of storing the read image is not made (NO in step S504), the processing proceeds to step S501 and the delayed writing unit 304c returns to monitoring of the buffer for writing. On the other hand, in the case where a request for terminating the process of storing the read image is made (YES in step S504), the delayed writing unit 304c ends writing the data to the HDD using SMR 203.

Figure 7:
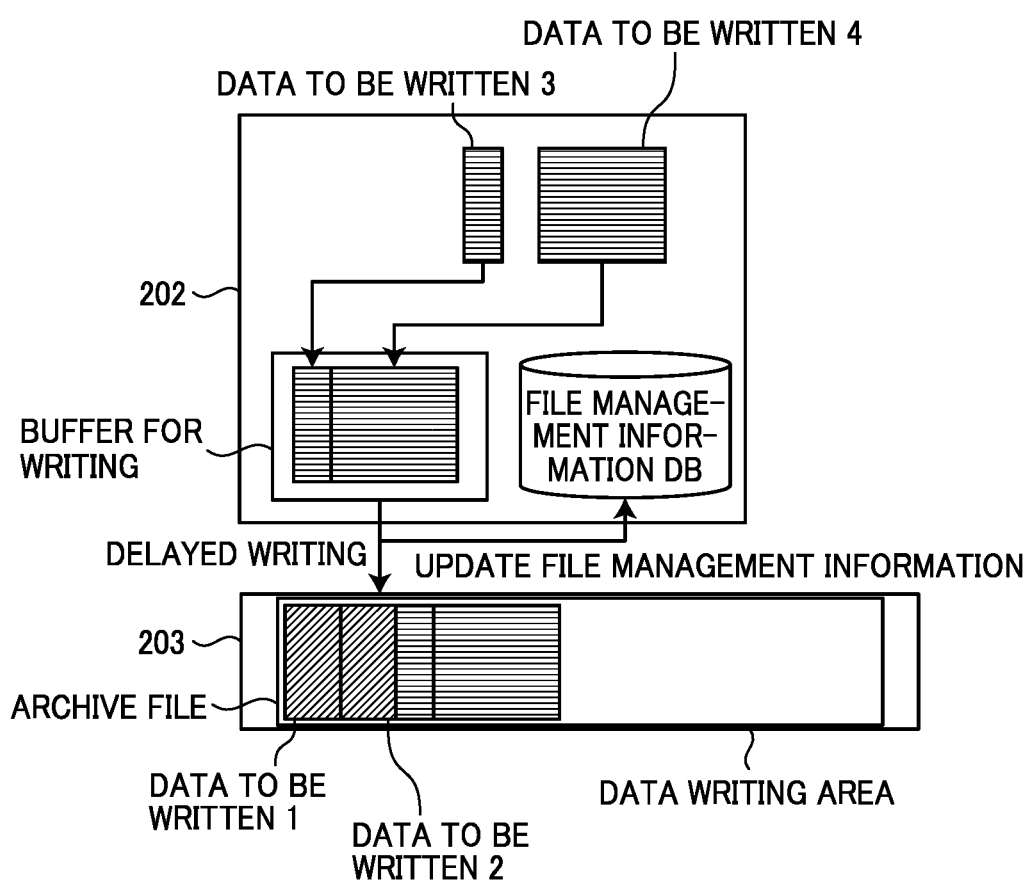
FIG. 7 is a diagram illustrating a configuration in which data is written to the HDD using SMR included in the information processing apparatus according to the embodiment of the present disclosure.
Figure 8:
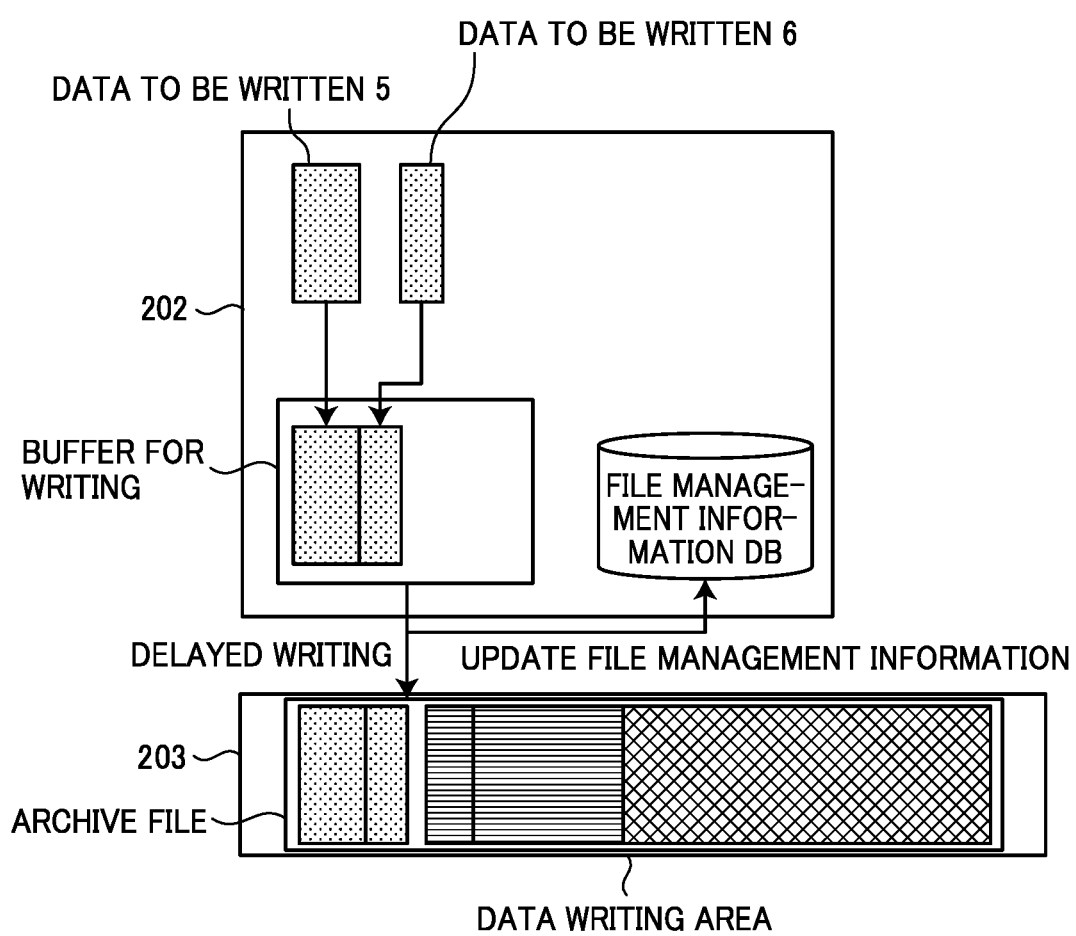
FIG. 8 is a diagram illustrating the configuration in which data is written to the HDD using SMR included in the information processing apparatus according to the embodiment of the present disclosure.

FIGS. 7 and 8 are diagrams each illustrating a configuration in which data is written to the HDD using SMR 203 included in the information processing apparatus 102 according to the embodiment of the present disclosure. As illustrated in FIG. 7, the delayed writing unit 304c secures one archive file that is huge in the entirety of the data writing area of the HDD using SMR 203. In this way, the delayed writing unit 304c writes data to a sector where the data is to be written. In addition, by the delayed writing unit 304c arranging, on the RAM 202, the file management information of the data in the archive file of the data writing area, the number of times of random access for managing the file is reduced.

In other words, the delayed writing unit 304c may arrange, on the RAM 202, the file management information of the data written to the data writing area of the HDD using SMR 203, and manage the file of the data written to the data writing area based on the file management information. In the conventional file system, random access to the HDD in which the file management information is stored frequently occurs for updating the file management information. However, by performing such unique file management that the file management information is arranged on the RAM 202, the number of times of random access to the HDD using SMR 203 is reduced.

Further, when writing data to the HDD using SMR 203 next time, the delayed writing unit 304c can sequentially write the data from the sector following the sector in which the previous data is written. Note that, when a file (data to be written) is written, the writing is executed with a four kilobyte (KB) boundary and a request for disk input or output (I/O) is issued by an operation of the direct I/O. In other words, the delayed writing unit 304c writes the data to the data writing area with the four KB boundary. In this way, when the overall control module 301 accesses a disk of a storage device such as an HDD, an operation of the direct I/O is performed to issue a request for disk I/O directly to the storage device not through the data caching mechanism of an operating system (OS). Thus, the overhead of the disk I/O is reduced in the OS.

Then, as illustrated in FIG. 8, when reaching the end of the data writing area, the delayed writing unit 304c returns to the head of the data writing area to additionally write the file (data to be written). In other words, when the position where the data is additionally written in the data writing area reaches the end of the data writing area, the delayed writing unit 304c returns to the head of the data writing area and additionally writes the data in the head of the data writing area. Thus, even when the disk capacity becomes full, new files continue to be written as old files are deleted. As a result, the product life is prevented from being limited by the HDD capacity.

Figure 9:
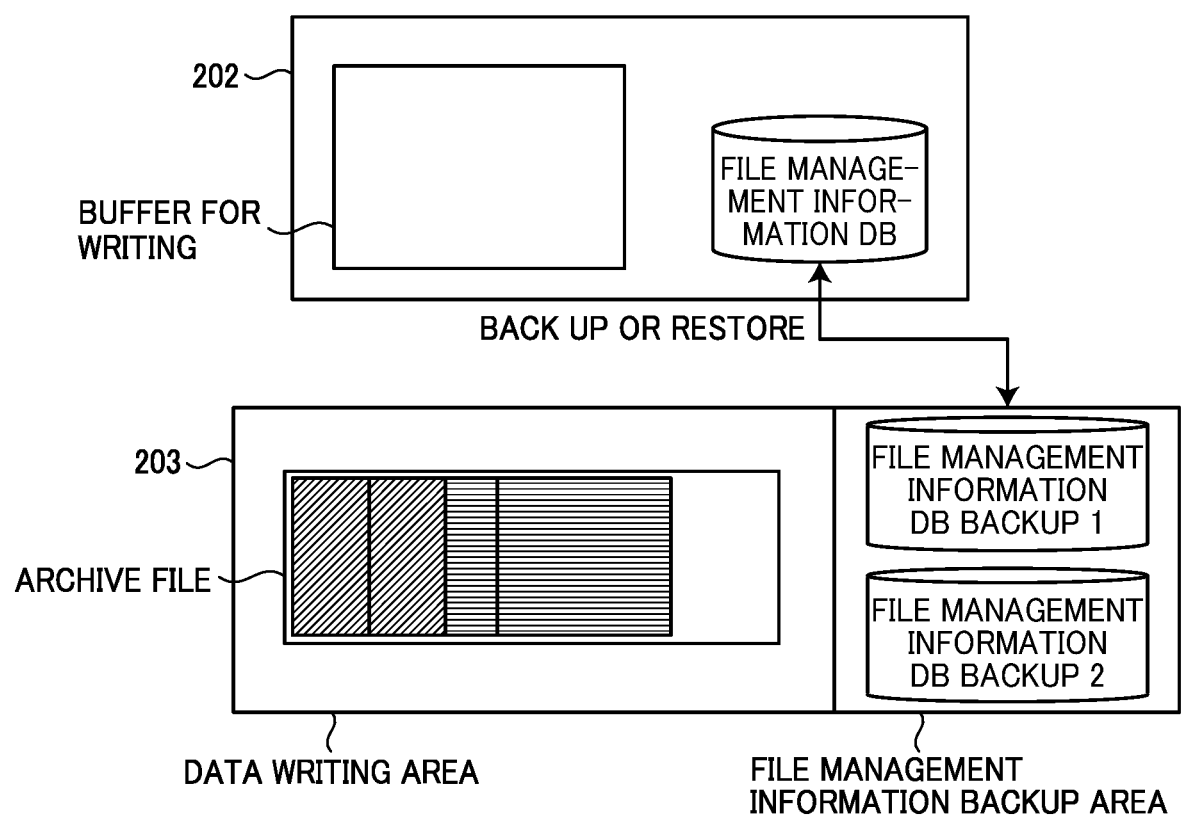
FIG. 9 is a diagram illustrating how file management information is handled in the information processing apparatus according to the embodiment of the present disclosure.

FIG. 9 is a diagram illustrating how the file management information is handled in the information processing apparatus 102 according to the embodiment of the present disclosure. The delayed writing unit 304c may secure an area for backing up the file management information (a file management information backup area) on the HDD using SMR 203 and create two backup files (file management information database (DB) backups 1 and 2) that are fixed. In other words, the delayed writing unit 304c doubles backup of the file management information. In this way, even when a sudden power outage occurs during backup, the power outage is coped with. In addition, by creating the backup files that are fixed, the data writing area is fixed during the process of backup and data can be written sequentially.

The delayed writing unit 304c may manage the file of the data written to the data writing area, using a DB (file management information DB) in which the file management information of the data written to the data writing area of the HDD using SMR 203 is included. In this way, the file management information can be accessed from a plurality of processes, and thus a configuration of good usability that implements operations in parallel is achieved.

In the present embodiment, the delayed writing unit 304c restores, in the RAM 202, the file management information in the HDD using SMR 203 at the start of the module operation. The delayed writing unit 304c also makes the file management information persistent by backing up the file management information stored in the RAM 202 in the HDD using SMR 203 at the end of the module operation. In other words, the delayed writing unit 304c backs up or restores the file management information at the start and the end of the system. Alternatively, the delayed writing unit 304c may overwrite a fixed file with the backup data of the file management information. In this way, the access to the disk for backing up or restoring the file management information can be limited only to sequential access. Thus, the process for backing up or restoring the file management information is increased in efficiency.

Figure 10:
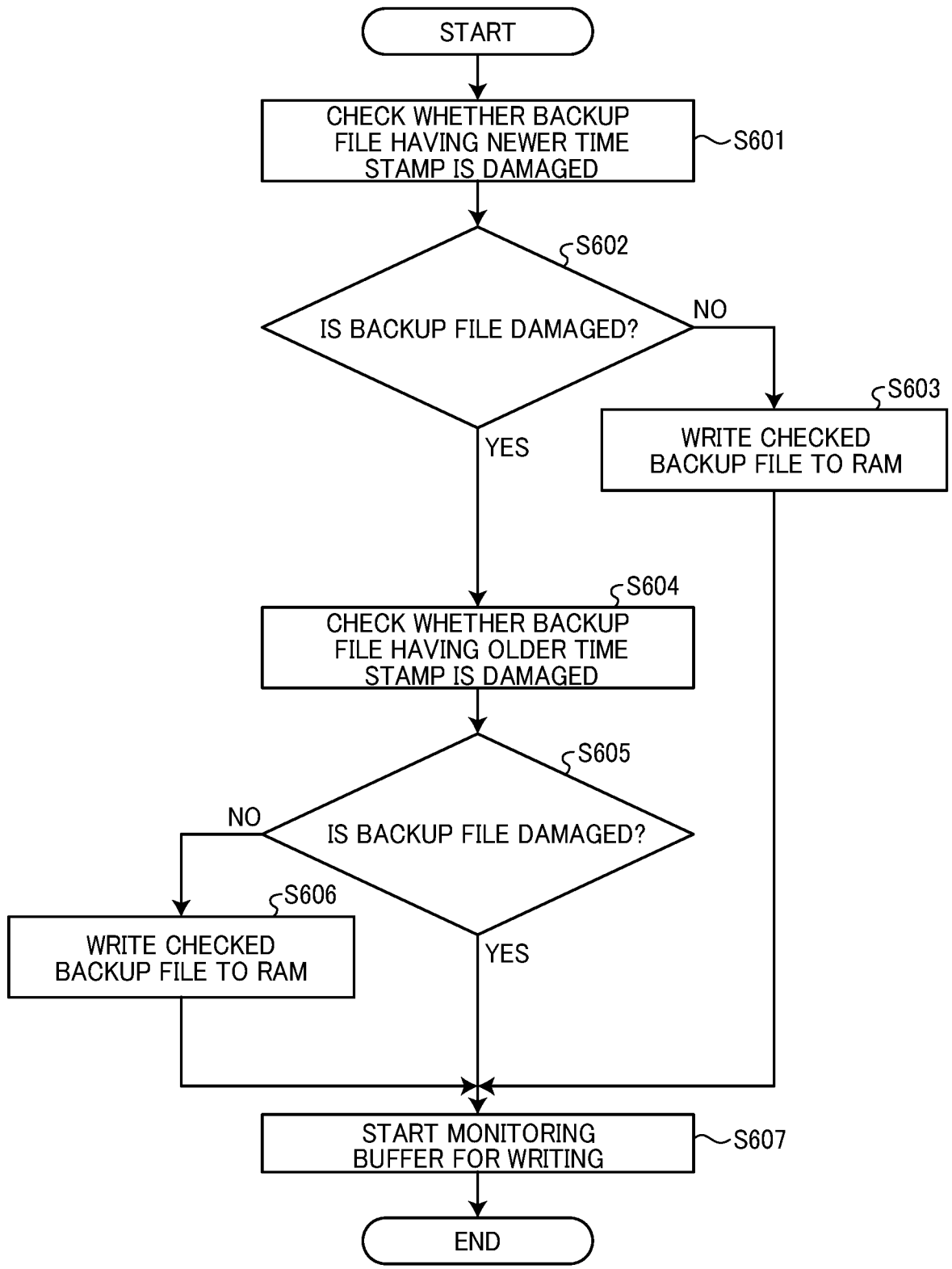
FIG. 10 is a flowchart of the processing to restore the file management information in the information processing apparatus according to the embodiment of the present disclosure.

FIG. 10 is a flowchart of the processing to restore the file management information in the information processing apparatus 102 according to the embodiment of the present disclosure. In the present embodiment, the delayed writing unit 304c checks whether a newer backup file (i.e., a backup file having a time stamp newer than that of the other backup file) of the two backup files (the file management information DB backups 1 and 2) that are fixed is damaged (steps S601 and S602).

In the case where the newer backup file is not damaged (NO in step S602), the delayed writing unit 304c writes the checked newer backup file to the RAM 202 (step S603). The delayed write unit 304c starts monitoring the buffer for writing for an operation of the delayed writing (step S607). On the other hand, in the case where the newer backup file is damaged (YES in step S602), the delayed writing unit 304c checks whether the older backup file is damaged (steps S604 and S605).

In the case where the older backup file (backup file having a time stamp older than that of the other backup file) is not damaged (NO in step S605), the delayed writing unit 304c writes the checked older backup file to the RAM 202 (step S606), and starts monitoring the buffer for writing (step S607). On the other hand, in the case where the older backup file is also damaged (YES in step S605), the delayed writing unit 304c abandons the restoration and starts monitoring the buffer for writing using a newly created backup of the file management information DB (step S607).

Figure 11:
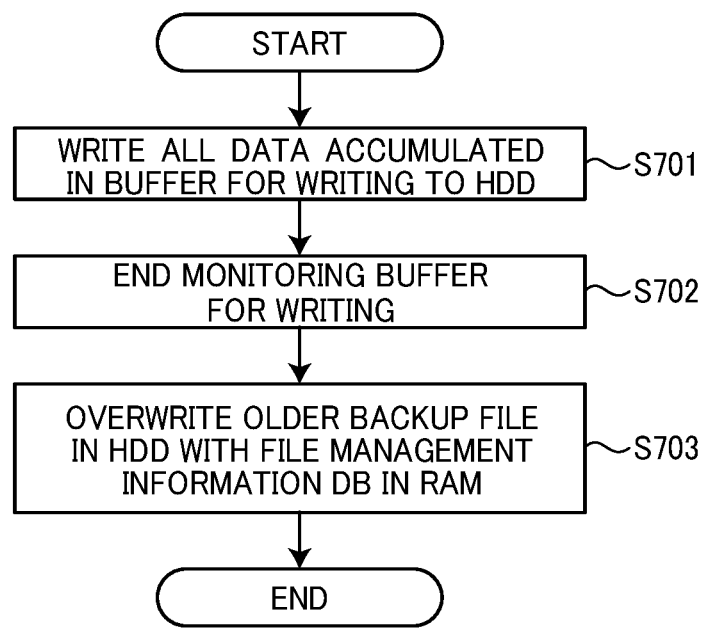
FIG. 11 is a flowchart of the processing to monitor a buffer for writing using a newly created backup of a file management information database (DB) in the information processing apparatus according to the embodiment of the present disclosure.

FIG. 11 is a flowchart of the processing to monitor the buffer for writing using the newly created backup of the file management information DB in the information processing apparatus 102 according to the embodiment of the present disclosure. The delayed writing unit 304c writes all data to be written accumulated in the buffer for writing to the HDD using SMR 203, and ends monitoring the buffer for writing (steps S701 and S702). The delayed writing unit 304c overwrites the older backup file of the two backup files in the HDD using SMR 203 with the file management information DB in the RAM 202 (step S703).

Figure 12:
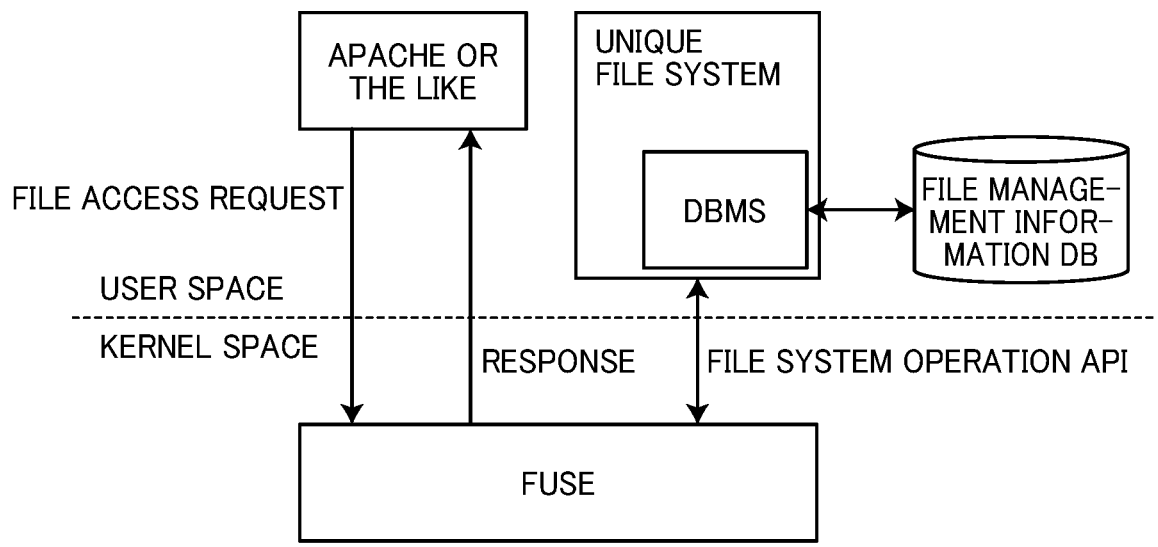
FIG. 12 is a diagram illustrating access to the HDD using SMR included in the information processing apparatus according to the embodiment of the present disclosure.

FIG. 12 is a diagram illustrating access to the HDD using SMR 203 included in the information processing apparatus 102 according to the embodiment of the present disclosure. In the present embodiment, the filesystem in userspace (FUSE) is used when a file is accessed from a user space process. In other words, the delayed writing unit 304c may use the FUSE when a file in the HDD using SMR 203 is accessed (for example, when data is written to the data writing area) from the user space process. By introducing the FUSE, as illustrated in FIG. 12, access to a file from the user space process can be configured to be performed through a file management system implemented in the user space. Accordingly, typical software of a data base management system (DBMS) can be adopted for the operation of the file management information DB, and thus a function of accessing to a unique file system constructed on the HDD using SMR 203 can be easily implemented.

In the following description, two cases are described. One is a case where the data writing area is managed as a plurality of fixed-length blocks in order to cope with overwriting or deletion of a file written to the HDD using SMR 203. The other is a case where a plurality of data writing areas is prepared and the data writing area to which data is written is switched among the data writing areas according to the characteristics of the data to be written.

Figure 13:
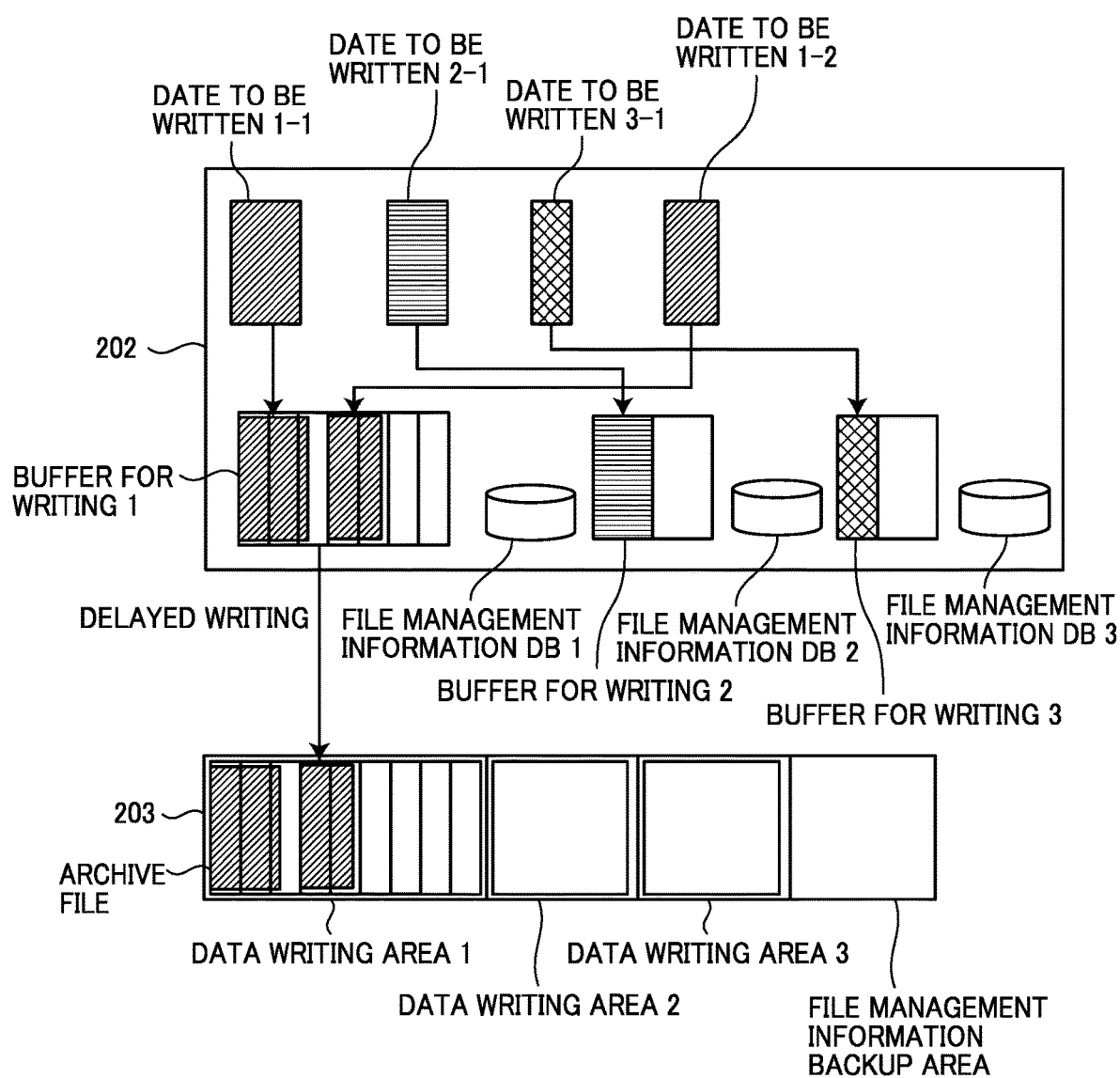
FIG. 13 is a diagram illustrating another configuration in which data is written to the HDD using SMR included in the information processing apparatus according to the embodiment of the present disclosure.

FIG. 13 is a diagram illustrating another configuration in which data is written to the HDD using SMR 203 included in the information processing apparatus 102 according to the embodiment of the present disclosure. The delayed writing unit 304c manages a data writing area 1 as a plurality of fixed-length blocks in order to cope with overwriting or deletion of a file written to the HDD using SMR 203. The delayed writing unit 304c also manages a buffer for writing 1 for executing delayed writing to the data writing area 1 as a plurality of fixed-length blocks similarly to the data writing area 1, and sequentially writes an entire block in which data has been written when the delayed writing is executed. In other words, the delayed writing unit 304c may manage the data writing area prepared in the HDD using SMR 203 as a plurality of fixed-length blocks, and divide data to be written into one or more fixed-length blocks to be written to the HDD using SMR 203.

By handling the data writing area 1 in units of fixed-length blocks in this way, the size of a sector fragmented at the time of overwriting or deletion is the size of a fixed-length block at most. Thus, the number of sectors to be fragmented into small sizes is reduced and the number of times of head seek when files written in discontinuous sectors are accessed is reduced.

The delayed writing unit 304c creates data writing areas 2 and 3 according to the characteristics of the data to be written and switches the data writing area to which the data is written according to the type of the data to be written. Examples of the characteristics of the data to be written are whether deletion or overwriting is required, whether the file is a file in which only additional writing is executed (typically a log file), whether the size of the file changes, and the size of data per file. In other words, the delayed writing unit 304c may prepare a plurality of data writing areas in the HDD using SMR 203 and switch the data writing area to which the data is written according to the type of the data to be written.

As a result, block division is not applied to data that does not require deletion or overwriting, and the maximum area of the data writing area is utilized. The size of a block can be tuned according to the size of data per file, to which the block division is to be applied. Also, the size of a buffer and the threshold value used for the delayed writing can be tuned according to the size of the data or the frequency of writing. Furthermore, since data whose file size changes is managed in the fixed area, it is possible to further pursue the improvement of the disk utilization rate, the improvement of the write performance using the fixed-length block management, and the improvement of the write performance by the delayed writing.

The delayed writing unit 304c may create a buffer for delayed writing in the RAM 202 for each data writing area according to the type of data to be written. As a result, a buffer for writing of an optimal size obtained by tuning, in accordance with the characteristics of the data to be written, the balance between the optimization of the performance of the disk I/O and the amount of memory used as the buffer for writing can be prepared.

As described above, according to the information processing apparatus 102 of the present embodiment, the number of free sectors to be fragmented is reduced. In addition, the number of requests for writing data of small size or the number of requests for writing data at random access is reduced. Furthermore, even when a cache flush occurs, the waiting time due to the delayed writing is concealed. As a result, when the HDD using SMR 203 is adopted, the write performance in an embedded system that requires real-time performance is ensured.

The program executed by the information processing apparatus 102 according to the embodiments described above is stored in advance in, for example, the ROM 204 and provided. The program executed by the information processing apparatus 102 according to the embodiments described above may be configured to be recorded in any computer-readable recording medium, such as a compact disc read-only memory (CD-ROM), a flexible disk (FD), a compact disc-recordable (CD-R), or a digital versatile disc (DVD), in an installable or executable file format and provided as a computer program product.

Alternatively, the program executed by the information processing apparatus 102 according to the embodiments described above may be stored on a computer connected to a network such as the Internet so that the program can be downloaded through the network and provided. Still, alternatively, the program executed by the information processing apparatus 102 according to the embodiments described above may be configured to be provided or distributed via a network such as the Internet.

The program executed by the information processing apparatus 102 according to the embodiments described above has a module structure including at least one of the above-described functional units (such as the overall control module 301, the I/F processing module 302, the read image reception control module 303, the HDD writing control module 304, and the image processing module 305). As actual hardware, a processor such as the CPU 201 reads the program from the above-described ROM 204 and executes the program to load the above-described functional units onto a main storage device and generate the overall control module 301, the I/F processing module 302, the read image reception control module 303, the HDD writing control module 304, and the image processing module 305 on the main storage device.

In the embodiments described above, the image forming apparatus according to an embodiment of the present disclosure is applied to a multifunction peripheral (MFP) that has at least two of a copying function, a printing function, a scanning function, and a facsimile function. However, no limitation is indicated thereby, and the image forming apparatus according to an embodiment of the present disclosure may be applied to any image forming apparatus such as a copier, a printer, a scanner, and a facsimile.

Aspects of the present disclosure are, for example, as follows.

Aspect 1

An information processing apparatus includes:
- a nonvolatile storage device that stores data written using shingled magnetic recording, in which tracks are partially arranged one over another in a radial direction;
- an overall control module serving as a component for requesting file writing that instructs the nonvolatile storage device to write the data in units of sectors;
- an additionally writing unit that additionally writes the data to a data writing area of the nonvolatile storage device; and
- a delayed writing unit that creates, on a volatile memory, a buffer for delayed writing in which the data to be written to the data writing area is temporarily held, and writes the data in the buffer for delayed writing to the nonvolatile storage device when a total amount of data accumulated in the buffer for delayed writing exceeds a threshold value.

Aspect 2

In the information processing apparatus according to Aspect 1, when a position where the data is additionally written in the data writing area reaches an end of the data writing area, the delayed writing unit returns to a head of the data writing area and additionally writes the data in the head of the data writing area.

Aspect 3

In the information processing apparatus according to Aspect 1, the delayed writing unit manages the data writing area prepared in the nonvolatile storage device as a plurality of fixed-length blocks, and divides the data to be written into one or more fixed-length blocks to be written to the nonvolatile storage device.

Aspect 4

In the information processing apparatus according to any one of Aspects 1 to 3, the delayed writing unit prepares a plurality of data writing areas in the nonvolatile storage device and switches the data writing area to which the data is written according to a type of data to be written.

Aspect 5 In the information processing apparatus according to Aspect 4, the delayed writing unit creates the buffer for delayed writing in the nonvolatile storage device for each data writing area according to the type of data to be written.

Aspect 6

In the information processing apparatus according to any one of Aspect 1 to 5, the delayed writing unit writes the data to the data writing area with a four kilobyte boundary.

Aspect 7

In the information processing apparatus according to any one of Aspects 1 to 6, the delayed writing unit arranges, on the volatile memory, file management information of the data written to the data writing area, and manages a file of the data written to the data writing area based on the file management information.

Aspect 8

In the information processing apparatus according to Aspect 7, the delayed writing unit manages, using a database in which the file management information is included, the file of the data written to the data writing area.

Aspect 9

In the information processing apparatus according to Aspect 7 or 8, the delayed writing unit backs up or restores the file management information at start and end of a system.

Aspect 10

In the information processing apparatus according to Aspect 9, the delayed writing unit overwrites a fixed file with backup data of the file management information.

Aspect 11

In the information processing apparatus according to Aspect 9 or 10, the delayed writing unit doubles backup of the file management information.

Aspect 12

In the information processing apparatus according to Aspect 8, access to the file is allowed from a user space process using a filesystem in userspace (FUSE).

Aspect 13

An information processing system includes:
a volatile memory;
a nonvolatile storage device that stores data written using shingled magnetic recording, in which tracks are partially arranged one over another in a radial direction;
an overall control module serving as a component for requesting file writing that instructs the nonvolatile storage device to write the data in units of sectors;
an additionally writing unit that additionally writes the data to a data writing area of the nonvolatile storage device; and
a delayed writing unit that creates, on the volatile memory, a buffer for delayed writing in which the data to be written to the data writing area is temporarily held, and writes the data in the buffer for delayed writing to the nonvolatile storage device when a total amount of data accumulated in the buffer for delayed writing exceeds a threshold value.

Aspect 14

A data writing method executed by an information processing apparatus includes:
instructing a nonvolatile storage device that stores data written using shingled magnetic recording, in which tracks are partially arranged one over another in a radial direction, to write the data in units of sectors;
additionally writing the data to a data writing area of the nonvolatile storage device; and
creating, on a volatile memory, a buffer for delayed writing in which the data to be written to the data writing area is temporarily held, and writing the data in the buffer for delayed writing to the nonvolatile storage device when a total amount of data accumulated in the buffer for delayed writing exceeds a threshold value.

Aspect 15

A non-transitory recording medium carrying computer readable codes for controlling a computer system to perform a method that includes:
instructing a nonvolatile storage device that stores data written using shingled magnetic recording, in which tracks are partially arranged one over another in a radial direction, to write the data in units of sectors;
additionally writing the data to a data writing area of the nonvolatile storage device; and
creating, on a volatile memory, a buffer for delayed writing in which the data to be written to the data writing area is temporarily held, and writing the data in the buffer for delayed writing to the nonvolatile storage device when a total amount of data accumulated in the buffer for delayed writing exceeds a threshold value.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

The functionality of the elements disclosed herein may be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carries out or is programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The invention claimed is:

1. An information processing apparatus comprising:
a nonvolatile memory that stores data written using shingled magnetic recording, in which tracks are partially arranged one over another in a radial direction; and
circuitry configured to:
instruct the nonvolatile memory to write the data in units of sectors;
additionally write the data to a data writing area of the nonvolatile memory;
create, on a volatile memory, a buffer for delayed writing in which the data to be written to the data writing area is temporarily held; and
write the data in the buffer for delayed writing to the nonvolatile memory in a case that a total amount of data accumulated in the buffer for delayed writing exceeds a threshold value,
wherein the circuitry is further configured to arrange, on the volatile memory, file management information of the data written to the data writing area, and manage a file of the data written to the data writing area based on the file management information,
wherein the circuitry is further configured to back up or restore the file management information at start and end of a system.

2. The information processing apparatus according to claim 1, wherein the circuitry is further configured to, in a case that a position where the data is additionally written in the data writing area reaches an end of the data writing area, return to a head of the data writing area and additionally write the data in the head of the data writing area.

3. The information processing apparatus according to claim 1, wherein the circuitry is further configured to manage the data writing area prepared in the nonvolatile memory as a plurality of fixed-length blocks, and divide the data to be written into one or more fixed-length blocks to be written to the nonvolatile memory.

4. The information processing apparatus according to claim 1, wherein the circuitry is further configured to prepare a plurality of data writing areas in the nonvolatile memory and switch the data writing area to which the data is written according to a type of data to be written, wherein the type of data includes a type of data that may be deleted and a type of data that is only added to.

5. The information processing apparatus according to claim 4, wherein the circuitry is configured to create the buffer for delayed writing in the nonvolatile memory for each data writing area according to the type of data to be written.

6. The information processing apparatus according to claim 1, wherein the circuitry is configured to write the data to the data writing area with a four kilobyte boundary.

7. The information processing apparatus according to claim 1, wherein the circuitry is configured to manage, using a database in which the file management information is included, the file of the data written to the data writing area.

8. The information processing apparatus according to claim 7, wherein the circuitry allows access to the file from a user space process using a filesystem in userspace (FUSE).

9. The information processing apparatus according to claim 1, wherein the circuitry is further configured to overwrite a fixed file with backup data of the file management information.

10. The information processing apparatus according to claim 1, wherein the circuitry is further configured to double backup of the file management information.

11. An information processing system comprising:
a volatile memory;
a nonvolatile memory that stores data written using shingled magnetic recording, in which tracks are partially arranged one over another in a radial direction; and
circuitry configured to:
instruct the nonvolatile memory to write the data in units of sectors;
additionally write the data to a data writing area of the nonvolatile memory;
create, on a volatile memory, a buffer for delayed writing in which the data to be written to the data writing area is temporarily held; and
write the data in the buffer for delayed writing to the nonvolatile memory in a case that a total amount of data accumulated in the buffer for delayed writing exceeds a threshold value,
wherein the circuitry is further configured to arrange, on the volatile memory, file management information of the data written to the data writing area, and manage a file of the data written to the data writing area based on the file management information,
wherein the circuitry is further configured to back up or restore the file management information at start and end of a system.

12. A data writing method executed by an information processing apparatus, the method comprising:
instructing a nonvolatile memory that stores data written using shingled magnetic recording, in which tracks are partially arranged one over another in a radial direction, to write the data in units of sectors;
additionally writing the data to a data writing area of the nonvolatile memory;
creating, on a volatile memory, a buffer for delayed writing in which the data to be written to the data writing area is temporarily held;
writing the data in the buffer for delayed writing to the nonvolatile memory in a case that a total amount of data accumulated in the buffer for delayed writing exceeds a threshold value;
arranging, on the volatile memory, file management information of the data written to the data writing area;
manage a file of the data written to the data writing area based on the file management information; and
backing up or restoring the file management information at start and end of a system.

13. A non-transitory recording medium storing a plurality of program codes which, when executed by one or more processors, causes the one or more processors to perform the method according to claim 12.

* * * * *